United States Patent
Chen et al.

(10) Patent No.: US 8,484,732 B1
(45) Date of Patent: Jul. 9, 2013

(54) PROTECTING COMPUTERS AGAINST VIRTUAL MACHINE EXPLOITS

(75) Inventors: Xuebin Chen, Nanjing (CN); Xiaochuan Wan, Nanjing (CN); Min Zhang, Nanjing (CN); Xinfeng Liu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 13/364,012

(22) Filed: Feb. 1, 2012

(51) Int. Cl.
*G06F 21/00* (2006.01)

(52) U.S. Cl.
USPC .................. 726/22; 726/23; 726/24; 726/25

(58) Field of Classification Search
USPC ...................................... 726/22–25
See application file for complete search history.

(56) References Cited

U.S. PATENT DOCUMENTS

| | | | |
|---|---|---|---|
| 6,091,412 A | 7/2000 | Simonoff et al. | |
| 6,356,931 B2 | 3/2002 | Ismael et al. | |
| 6,401,134 B1 | 6/2002 | Razavi et al. | |
| 6,433,794 B1 | 8/2002 | Beadle et al. | |
| 6,492,995 B1 | 12/2002 | Atkin et al. | |
| 6,647,544 B1 | 11/2003 | Ryman et al. | |
| 6,757,895 B1 | 6/2004 | Beadle et al. | |
| 6,799,195 B1 | 9/2004 | Thibault et al. | |
| 6,842,777 B1 | 1/2005 | Tuli | |
| 6,842,897 B1 | 1/2005 | Beadle et al. | |
| 6,941,552 B1 | 9/2005 | Beadle et al. | |
| 6,976,059 B1 | 12/2005 | Rogalski et al. | |
| 7,039,691 B1 | 5/2006 | Turnidge | |
| 7,191,211 B2 | 3/2007 | Tuli | |
| 7,290,129 B2 | 10/2007 | Chebolu et al. | |
| 7,409,719 B2 | 8/2008 | Armstrong et al. | |
| 7,506,257 B1 | 3/2009 | Chavez et al. | |
| 7,634,811 B1 | 12/2009 | Kienzle et al. | |
| 8,024,790 B2 * | 9/2011 | Zhao et al. ..................... | 726/17 |
| 2001/0054062 A1 | 12/2001 | Ismael et al. | |
| 2002/0129281 A1 | 9/2002 | Hatfalvi et al. | |
| 2003/0041106 A1 | 2/2003 | Tuli | |
| 2004/0148608 A1 | 7/2004 | Gendreau et al. | |
| 2004/0158830 A1 | 8/2004 | Chung et al. | |
| 2004/0230643 A1 | 11/2004 | Thibault et al. | |

(Continued)

FOREIGN PATENT DOCUMENTS

WO WO 2005066786 A1 7/2005

OTHER PUBLICATIONS

VMware VMotion Live migration of virtual machines without service interuption, 2 sheets, webpage [online][retrieved on Jun. 3, 2009], retrieved from the Internet: http://www.vmware.com/files/pdf/vmotion_datasheet.pdf.

(Continued)

*Primary Examiner* — Chau Le
(74) *Attorney, Agent, or Firm* — Okamoto & Benedicto LLP

(57) ABSTRACT

Computers are protected against virtual machine exploits. A computer includes an exploit monitor for a virtual machine running in the computer. Loading of a virtual machine program in the virtual machine triggers the exploit monitor to modify the virtual machine program after the virtual machine program is loaded in the virtual machine but before the virtual machine program is executed in the virtual machine. The modification includes adding monitoring code, such as one or more checkpoints, in the virtual machine program. When the monitoring code is reached during execution of the virtual machine program in the virtual machine, the virtual machine program is evaluated to determine whether or not the virtual machine program is a virtual machine exploit.

10 Claims, 4 Drawing Sheets

U.S. PATENT DOCUMENTS

| | | | |
|---|---|---|---|
| 2005/0188361 | A1 | 8/2005 | Cai et al. |
| 2005/0198485 | A1 | 9/2005 | Nguyen et al. |
| 2005/0246176 | A1 | 11/2005 | Creamer et al. |
| 2006/0112342 | A1 | 5/2006 | Bantz et al. |
| 2007/0079307 | A1 | 4/2007 | Dhawan et al. |
| 2007/0199058 | A1 | 8/2007 | Baumgart et al. |
| 2008/0155537 | A1 | 6/2008 | Dinda et al. |
| 2008/0163207 | A1 | 7/2008 | Reumann et al. |
| 2009/0204964 | A1 | 8/2009 | Foley et al. |
| 2009/0282101 | A1* | 11/2009 | Lim et al. .................. 709/203 |
| 2010/0251363 | A1* | 9/2010 | Todorovic .................. 726/22 |
| 2011/0296245 | A1* | 12/2011 | Alberi et al. ................ 714/38.1 |
| 2012/0317647 | A1* | 12/2012 | Brumley et al. ............ 726/25 |

OTHER PUBLICATIONS hp Introduction to Virtual Machine Migration, 2 sheets, webpage [online][retrieved on Jun. 3, 2009], retrieved from the Internet: http://docs.hp.com/en/T2767-90067/ch10s01.html.

Interop Labs What is Cisco NAC?, 2 sheets, [retrieved on Jun. 3, 2009], retrieved from the internet: http://www.interop.com/archive/pdfs/2007-06WhatIsCiscoNAC.pdf.

VMware VSphere Live migration of virtual machines, 2 sheets, webpage [online][retrieved on Jun. 3, 2009], retrieved from the Internet: http://www.vmware.com/products/vi/vc/vmotion.html.

Cisco Systems—Cisco Network Admission Control (NAC), 2 sheets, webpage [online][retrieved on Jun. 3, 2009], retrieved from the Internet: http://www.cisco.com/en/US/netsol/ns466/networking_solutions_package.html.

Cisco NAC Appliance—Wikipedia, the free encyclopedia, 5 sheets [retrieved on Jun. 3, 2009], retrieved from the Internet: http://en.wikipedia.org/wiki/Clean_Access_Agent.

Microsoft About NAP (Windows), 1 sheet, webpage [online][retrieved on Jun. 3, 2009], retrieved from the internet: http://msdn.microsoft.com/en-us/library/aa369143(VS.85).aspx.

Java virtual machine—Wikipedia, the free encyclopedia, 8 sheets [retrieved on Jan. 6, 2012], retrieved from the internet: http://en.wikipedia.org/wiki/Java_virtual_machine.

java.security Class AllPermission (Java 2 Platform SE v1.4.2), 5 sheets [retrieved on Jan. 6, 2012], retrieved from the Internet: http://docs.oracle.com/javase/1.4.2./docs/api/java/security/AllPermission.html.

Qin Li, et al. "HyperMIP: Hypervisor controlled Mobile IP for Virtual Machine Live Migration across Networks", 2008, pp. 80-88, 11th IEEE High Assurance Systems Engineering Symposium.

Koichi Onoue, et al. "A Virtual Machine Migration System Based on a CPU Emulator", 2006, pp. 1-8, IEEE 2nd International Workshop on Virtualization Technology in Distributed Computing (VTDC 2006).

* cited by examiner

```
1  0 aload_0
2  1 ldc #2 <<all permissions>>
3  3 invokespecial #35 <java/security/Permission/<init>(Ljava/lang/String;)V>
4  6 return
```

FIG. 4

```
1  0 aload_0
2  2 invokestatic #41 <test/MyDetourClass/initAllPermission(Ljava/lang/Object;)V>    ⎫
3  5 aload_0                                                                          ⎪
4  6 ldc #2 <<all permissions>>                                                       ⎬ 410
5  8 invokespecial #35 <java/security/Permission/<init>(Ljava/lang/String;)V>         ⎪
6 11 return                                                                           ⎭
```

PROTECTING COMPUTERS AGAINST VIRTUAL MACHINE EXPLOITS

BACKGROUND OF THE INVENTION

1. Field of the Invention

The present invention relates generally to computer security, and more particularly but not exclusively to methods and apparatus for protecting computers against virtual machine exploits.

2. Description of the Background Art

A virtual machine program comprises virtual machine code that is executed in a virtual machine (e.g., a JAVA Virtual Machine). In contrast to virtual machine code, native code is compiled or interpreted to run with a particular processor, such as an x-86 class processor. Malicious codes that take advantage of vulnerabilities of virtual machine programs are called "virtual machine exploits." The number of virtual machine exploits continually increases, posing a serious danger to computers worldwide. Unfortunately, currently available antivirus solutions do not adequately protect computers from virtual machine exploits because a typical antivirus relies on traditional hook points that are too far removed from the virtual machine environment.

SUMMARY

In one embodiment, a method of protecting a computer against a virtual machine exploit includes loading an exploit monitor in a virtual machine running in a computer. Loading of a virtual machine program into the virtual machine is detected. The exploit monitor modifies the virtual machine program to include a checkpoint after the virtual machine program has been loaded into the virtual machine but before the virtual machine program runs in the virtual machine. The virtual machine program is executed in the virtual machine. Determination of whether or not the virtual machine program comprises a virtual machine exploit is made when the checkpoint is reached during execution of the virtual machine program in the virtual machine.

In another embodiment, a computer comprises a processor and a memory comprising computer-readable program code executed by the processor, the memory comprises a virtual machine, a virtual machine program loaded into the virtual machine, and an exploit monitor configured to modify the virtual machine program upon loading of the virtual machine program into the virtual machine but before the virtual machine program is executed in the virtual machine, the exploit monitor being configured to insert a checkpoint into the virtual machine program to determine whether the virtual machine program comprises a virtual machine exploit when the checkpoint is reached during execution of the virtual machine program.

In another embodiment, a method of protecting a computer against a virtual machine exploit includes detecting loading of a virtual machine program into a virtual machine running in a computer. The virtual machine program is modified to include monitoring code after the virtual machine program has been loaded into the virtual machine but before the virtual machine program runs in the virtual machine. The virtual machine program is executed in the virtual machine. The monitoring code is executed in the virtual machine to determine whether or not the virtual machine program comprises a virtual machine exploit.

These and other features of the present invention will be readily apparent to persons of ordinary skill in the art upon reading the entirety of this disclosure, which includes the accompanying drawings and claims.

DESCRIPTION OF THE DRAWINGS

FIGS. 4 and 5 illustrate how an exploit monitor modifies a virtual machine program in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
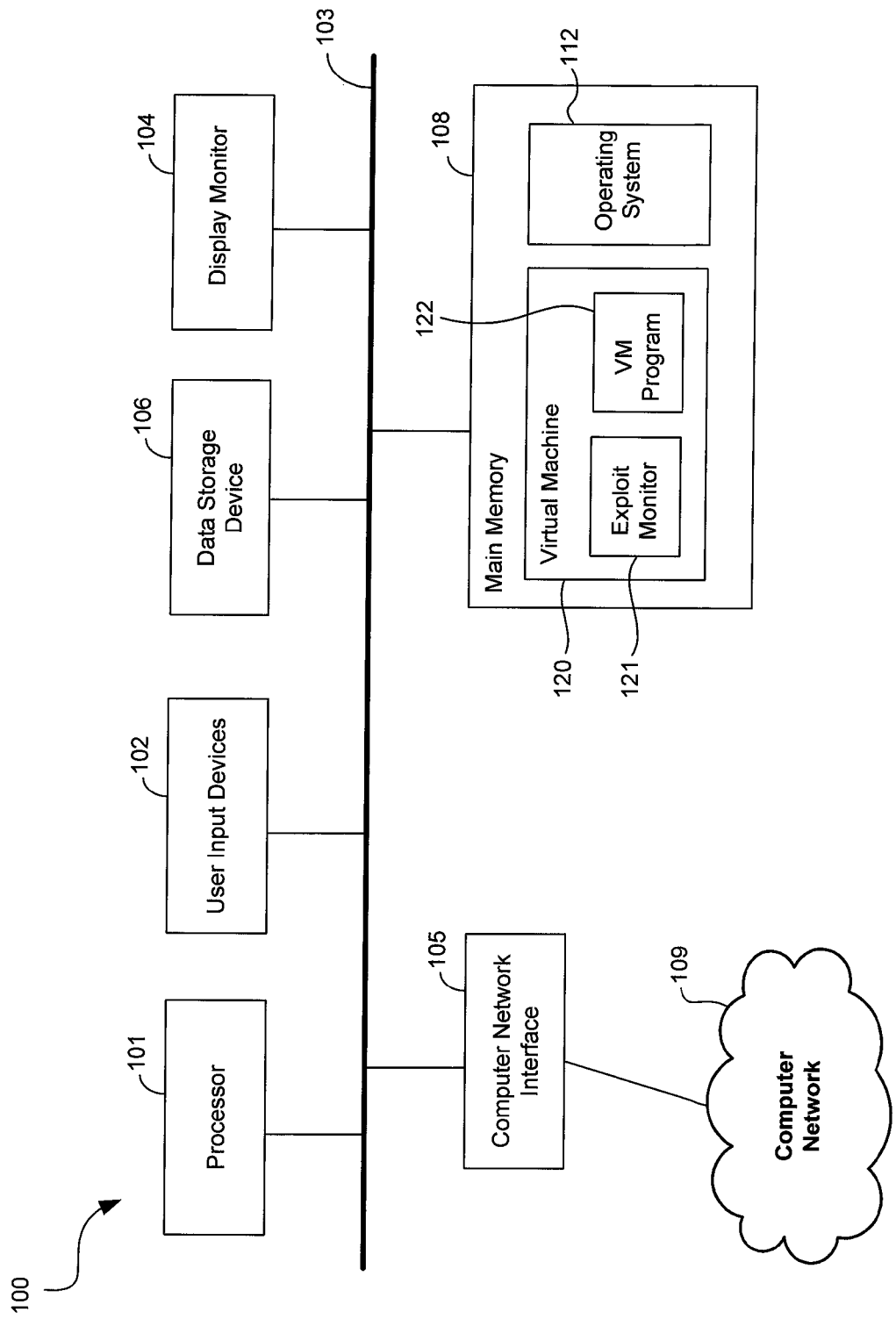
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be a desktop computer, a laptop computer, a server computer, or other computing device. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules stored non-transitory in the main memory 108 for execution by the processor 101. In the example of FIG. 1, the software modules in the memory 108 include an operating system 112, a virtual machine 120, an exploit monitor 121, and one or more virtual machine (VM) programs 122. The software modules comprise computer-readable program codes. The computer 100 may be configured to perform its functions by executing the software modules, which may be loaded from the data storage device 106 to the main memory 108. The software modules may also be received over the computer network interface 105 for loading into the main memory 108. The software modules 110 may also be made available in other computer-readable medium including optical disk, flash drive, and other memory devices.

The operating system 112 may comprise a commercially available operating system. In one embodiment, the operating system 112 comprises the Microsoft Windows™ operating system. The virtual machine 120 may comprise a conventional virtual machine, such as a JAVA virtual machine or a Flash ActionScript™ virtual machine (Flash AVM). A virtual machine program 122 comprises virtual machine code configured to be executed by a virtual machine. In one embodiment where the virtual machine 120 comprises a JAVA virtual machine, the virtual machine program 122 comprises JAVA bytecode.

The exploit monitor 121 may comprise virtual machine code configured to be executed by the virtual machine 120 to protect the computer 100 against virtual machine exploits. The exploit monitor 121 may be configured to be loaded into the virtual machine 120 when the virtual machine 120 is started up, to detect loading of a virtual machine program 122 into the virtual machine 120, to modify the virtual machine program 122 to include monitoring code before the virtual machine program 122 is executed by the virtual machine 120, and to monitor and analyze the actions of the virtual machine program 122 during runtime, i.e., when the virtual machine program 122 is executed by the virtual machine 120, to determine whether or not the virtual machine program 122 is a virtual machine exploit. Separate exploit monitors 121 may be implemented for different types of virtual machines 120. For example, an exploit monitor 121 for JAVA bytecode may be implemented for a JAVA virtual machine 120, another exploit monitor 121 for Flash ActionScript™ bytecode may be implemented for Flash ActionScript™ virtual machine, and so on.

Figure 2:
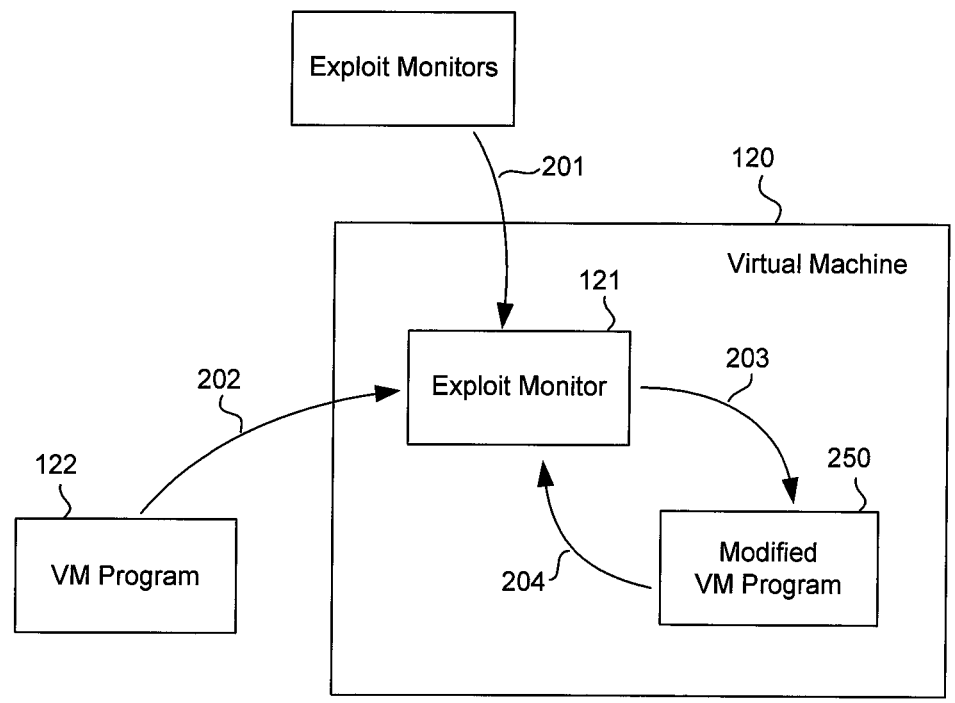
FIG. 2 shows a flow diagram schematically illustrating a method of protecting a computer against virtual machine exploits in accordance with an embodiment of the present invention.

FIG. 2 shows a flow diagram schematically illustrating a method of protecting a computer against virtual machine exploits in accordance with an embodiment of the present invention. The flow diagram of FIG. 2 is explained using the components shown in FIG. 1 for illustration purposes only. Other components may also be employed without detracting from the merits of the present invention.

In the example of FIG. 2, whenever a virtual machine 120 is started, a corresponding (i.e., compatible) exploit monitor 121 is injected into the virtual machine 120. For example, an exploit monitor 121 for detecting JAVA bytecode exploits is injected into a JAVA virtual machine when the JAVA virtual machine is started, an exploit monitor 121 for detecting Flash ActionScript™ bytecode is injected into a Flash ActionScript™ virtual machine when the Flash ActionScript™ virtual machine is started, and so on. The method of FIG. 2 may thus include a step of determining the type of virtual machine being started and selecting an exploit monitor from a plurality of exploit monitors, the selected exploit monitor being for the type of the virtual machine being started, and injecting the selected exploit monitor into the virtual machine (see arrow 201).

A virtual machine program is normally stored in a binary file with a format compatible with the virtual machine where the virtual machine program is to be run. For example, the JAVA programming language stores JAVA bytecode in accordance with the class file format (with ".class" extension name). When a virtual machine program is started, the computer loads the binary file of the virtual machine program into the virtual machine. The binary file of the virtual machine program contains the virtual machine code of the virtual machine program and definitions of object oriented programming (OOP) methods. The virtual machine code, also referred to as "bytecode," comprises virtual machine-specific operation codes.

When a new binary file of a virtual machine program 122 is loaded into the virtual machine 120 (see arrow 202), the exploit monitor 121 dynamically analyzes the virtual machine program 122 and modifies the virtual machine program 122 to create a modified virtual machine program 250 (see arrow 203). The exploit monitor 121 modifies the virtual machine program 122 at runtime, when the binary file of the virtual machine program 122 is loaded into the virtual machine 120 but before the virtual machine program 122 is executed by the virtual machine 120. The modified virtual machine program 250 comprises the virtual machine program 122 plus some monitoring code configured to allow the exploit monitor 121 to evaluate the virtual machine program 122 (see arrow 204) and make a determination of whether or not the virtual machine program comprises a virtual machine exploit. The exploit monitor 121 may be configured to perform one or more response actions upon detecting that the virtual machine program 122 performs actions indicative of a virtual machine exploit. The response actions may include alerting the user or an administrator, blocking execution of the virtual machine program 122, and so on.

In one embodiment, the exploit monitor 121 is configured to analyze the format of the virtual machine program 122 to obtain the control flow graphic (CFG) of the virtual machine program 122 and decide where to insert checkpoints within the virtual machine program 122. The exploit monitor 121 then modifies the virtual machine program 122 by inserting one or more checkpoints into the virtual machine program 122. In the checkpoints, the state of the virtual machine 120 (e.g., stack trace, API parameters, return value, etc.) may be checked to determine whether the virtual machine program 122 is performing a malicious action indicative of an exploit. For example, a checkpoint may invoke an OOP method for detecting virtual machine exploits. The OOP method may be, but not necessarily, a part of the exploit monitor 121. For example, the OOP method may call back into the exploit monitor 121 or a module of the exploit monitor 121.

Figure 3:
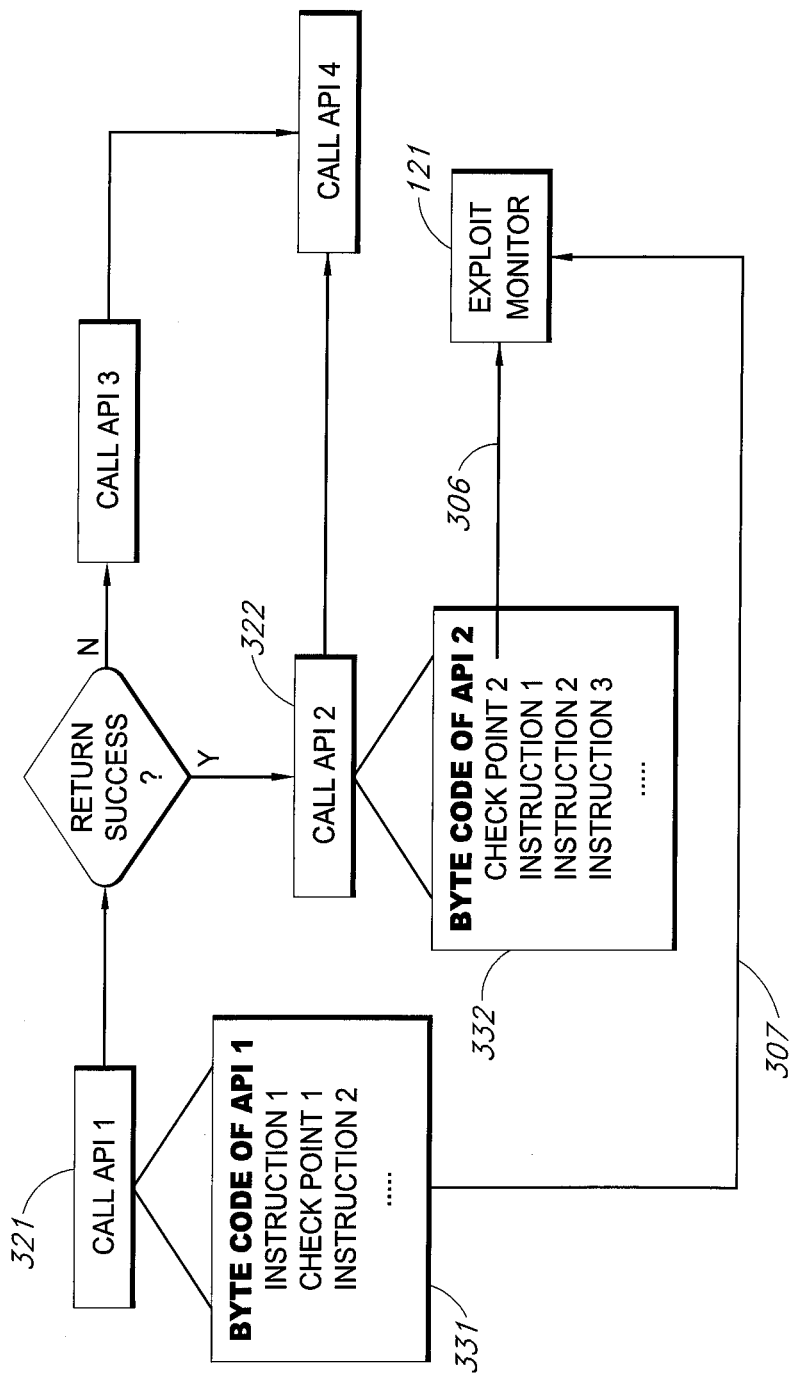
FIG. 3 shows a flow diagram schematically illustrating a method of protecting computers against virtual machine exploits in accordance with an embodiment of the present invention.

FIG. 3 shows a flow diagram schematically illustrating a method of protecting computers against virtual machine exploits in accordance with an embodiment of the present invention. The flow diagram of FIG. 3 is explained using the components shown in FIG. 1 for illustration purposes only. Other components may also be employed without detracting from the merits of the present invention. The method of FIG. 3 is performed in the virtual machine 120.

In the example of FIG. 3, a virtual machine program 122 makes API (application programming interface) calls to perform various functions. For example, the virtual machine program 122 may call an API 1 having the bytecode 331, an API 2 having the bytecode 332, an API 3, and an API 4. When the binary file of the virtual machine program 122 is loaded into the virtual machine 120, the exploit monitor 121 dynamically analyzes the virtual machine codes of the virtual machine program 122 and inserts checkpoints where appropriate. For example, the exploit monitor 121 may be configured to insert checkpoints before or around particular instructions known to be exploited by malicious codes. In the example of FIG. 3, the exploit monitor 121 inserted a checkpoint 1 between the instruction 1 and the instruction 2 of the bytecode 331. The exploit monitor 121 also inserted a checkpoint 2 before the instruction 1 of the bytecode 332. The exploit monitor 121 did not find a suspicious instruction or format in the API 3 and API 4, and accordingly did not include a checkpoint in them.

When the virtual machine program 122 calls the API 1 (see block 321), the checkpoint 1 is reached and executed to allow the exploit monitor 121 to receive and check the state of the virtual machine 120 to determine whether or not the virtual machine program 122 is performing a malicious action indicative of a virtual machine exploit (see arrow 307). Similarly, when the virtual machine program 122 calls the API 2

(see block 322), the checkpoint 2 is reached and executed to allow the exploit monitor 121 to receive and check the state of the virtual machine 120 to determine whether or not the virtual machine program 122 is performing a malicious action indicative of a virtual machine exploit (see arrow 306). In the example of FIG. 3, the control flow goes to call the API 2 when the API 1 returns a success. Otherwise, the control flow goes to call the API 3. The API 4 is called after execution of the API 2 or API 3. The control flow graphic of FIG. 3 is provided for illustration purposes only.

FIGS. 4 and 5 illustrate how the exploit monitor 121 modifies a virtual machine program 122 in accordance with an embodiment of the present invention. The example of FIGS. 4 and 5 is for an exploit monitor 121 of a JAVA virtual machine. The exploit monitor 121 is accordingly referred to as a "JAVA exploit monitor 121" in this example.

JAVA virtual machine code is stored in a format referred to as a "JAVA class file," which usually has the ".class" extension name. In a JAVA class file, an OOP method is stored in a data structure named "method_info", which contains a description of the OOP method as well as the virtual machine code (JAVA bytecode in this example) for the OOP method. The virtual machine code is executed by the JAVA virtual machine when the OOP method is called by a JAVA program.

The JAVA exploit monitor 121 is registered as a JAVA agent library. Each time a new JAVA virtual machine starts, the JAVA exploit monitor 121 is injected into the JAVA virtual machine. When the JAVA virtual machine loads a new JAVA class file, the JAVA exploit monitor 121 gets notified, and the JAVA exploit monitor 121 then analyzes the JAVA class file and dynamically adds one or more check points to the JAVA class file depending on the content of the JAVA class file.

In one embodiment, the JAVA exploit monitor 121 adds one or more checkpoints to the JAVA class file when the JAVA class file includes a class that is usually exploited by a virtual machine exploit. For example, there is a JAVA runtime class named "Java.Security.AllPermission". By creating an instance of this class, the running virtual machine program may get full access to use and control of the local computer. Java virtual machine exploits often use the AllPermission class (combined with some privilege-escalation vulnerabilities in JAVA virtual machines, e.g. CVE-2008-5353, CVE-2010-0094) to get full permission to use the computer in order to perform malicious actions, such as to download malicious payloads (e.g., computer viruses), execute malicious codes, etc. To monitor this dangerous operation, the JAVA exploit monitor 121 adds a check point to the construct OOP method of the AllPermission class, the OOP method being referred to as the "<init> method". FIG. 4 shows the original bytecode of the <init> method before modification by the JAVA exploit monitor 121.

FIG. 5 shows the bytecode of the <init> method after insertion of a checkpoint by the JAVA exploit monitor 121. In the example of FIG. 5, the JAVA exploit monitor 121 added two instructions to the <init> method. The original bytecode of the <init> method is labeled as 410, and the instructions added by the JAVA exploit monitor 121 are labeled as 401. The added instructions call an OOP method named initAllPermission in the test.MyDetourClass, which is part of the JAVA exploit monitor 121 in this example. In the initAllPermission, a check is undertaken to detect an attack by a virtual machine exploit. The initAllPermission OOP method may take into account where the JAVA class file came from (e.g., locally or from an unknown website) and whether the JAVA class file has signed certification. Embodiments of the present invention allow for monitoring of virtual machine exploits, and may be employed in conjunction with various exploit detection algorithms without detracting from the merits of the present invention.

The just provided example of detecting JAVA virtual machine exploits may also be employed to detect JAVA attacks that involve buffer overflow, memory corruption, sandbox privilege escalation, and so on. It can also be used in a backend to distinguish malicious JAVA files from normal ones.

Methods and apparatus for protecting computers against virtual machine exploits have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting a computer against a virtual machine exploit, the method comprising:
   selecting an exploit monitor from a plurality of exploit monitors, the exploit monitor being selected based on a type of a virtual machine running in a computer;
   detecting loading of a virtual machine program into the virtual machine;
   in response to detecting the loading of the virtual machine program, the exploit monitor modifying the virtual machine program by inserting a checkpoint before an instruction exploited by the virtual machine exploit after the virtual machine program has been loaded into the virtual machine but before the virtual machine program runs in the virtual machine, where the instruction is part of a class that allows for exploiting a privilege-escalating vulnerability;
   executing the virtual machine program in the virtual machine; and
   determining whether or not the virtual machine program comprises a virtual machine exploit when the checkpoint is reached during execution of the virtual machine program in the virtual machine.

2. The method of claim 1 wherein the virtual machine comprises a JAVA virtual machine and the exploit monitor comprises an exploit monitor for the JAVA virtual machine.

3. The method of claim 1 wherein the checkpoint invokes an object oriented programming (OOP) method.

4. The method of claim 3 wherein the OOP method calls back into the exploit monitor.

5. The method of claim 1 wherein the instruction is part of a class that provides full access to use of the computer.

6. A computer comprising:
   a processor; and
   a memory comprising computer-readable program code that when executed by the processor causes the computer to select an exploit monitor from a plurality of exploit monitors based on a type of a virtual machine running in the computer, detect a virtual machine program loaded into the virtual machine, modify the virtual machine program upon loading of the virtual machine program into the virtual machine but before the virtual machine program is executed in the virtual machine in response to detecting the loading of the virtual machine by inserting a checkpoint before an instruction exploited by a virtual machine exploit to allow the exploit monitor to determine whether the virtual machine program comprises the virtual machine exploit when the checkpoint is reached during execution of the virtual machine program, where the instruction is part of a class that allows for exploiting a privilege-escalating vulnerability.

7. The computer of claim 6 wherein the virtual machine program comprises JAVA bytecode and the virtual machine comprises a JAVA virtual machine.

8. The computer of claim 6 wherein the checkpoint invokes an object oriented programming (OOP) method.

9. The computer of claim 8 wherein the OOP method calls back into the exploit monitor.

10. The computer of claim 6 wherein the instruction is part of a class that provides full access to use of the computer.

* * * * *